United States Patent [19]

Takezawa et al.

[11] Patent Number: 5,119,071
[45] Date of Patent: Jun. 2, 1992

[54] METHOD AND APPARATUS FOR CONTROLLING INDUCTION MOTOR FOR COMPRESSOR

[75] Inventors: Masaaki Takezawa; Takashi Ogawa; Norio Hayashi, all of Gunma, Japan

[73] Assignee: Sanyo Electric Co., Ltd., Osaka, Japan

[21] Appl. No.: 651,382

[22] PCT Filed: Jul. 3, 1990

[86] PCT No.: PCT/JP90/00858
§ 371 Date: Mar. 5, 1991
§ 102(e) Date: Mar. 5, 1991

[87] PCT Pub. No.: WO91/01062
PCT Pub. Date: Jan. 24, 1991

[30] Foreign Application Priority Data
Jul. 10, 1989 [JP] Japan .................. 1-177455
Dec. 27, 1989 [JP] Japan .................. 1-341228

[51] Int. Cl.⁵ ............................ H02K 33/14
[52] U.S. Cl. ..................... 318/130; 318/138; 318/811; 318/721; 318/686; 62/228.4; 62/6
[58] Field of Search .......... 318/686, 130, 138, 139, 318/254, 439, 801-811, 720, 721; 62/228.4, 6

[56] References Cited
U.S. PATENT DOCUMENTS
4,401,419 8/1983 Rabe .................... 318/254
4,474,537 10/1984 Dölz ................... 318/130
4,604,036 8/1986 Sutou et al. .
4,879,502 11/1989 Endo et al. ............. 318/808
5,018,357 5/1991 Livingstone et al. ..... 62/228.4

FOREIGN PATENT DOCUMENTS
58-15498  1/1983  Japan .
60-60286  4/1985  Japan .
63-23527  1/1988  Japan .
63-23585  1/1988  Japan .
63-290182 11/1988  Japan .

Primary Examiner—William M. Shoop, Jr.
Assistant Examiner—John W. Cabeca
Attorney, Agent, or Firm—Wenderoth, Lind & Ponack

[57] ABSTRACT

DC power is supplied to an induction motor for a compressor by switching ON/OFF in response to a modulated voltage waveform obtained from modulating waves which are used for generating AC power for energizing an induction motor and a carrier wave according to PWM theory. The compressor has a compressing element rotated by the induction motor, and the modulating wave is corrected according to a rotational angle of the compressing element. A sine wave having the same frequency as the modulating wave is added to the modulating wave, and a phase of the sine wave is controlled so that a maximum value of the sine wave corresponds to the compression stage of the compressing element. Thus, a rotation speed of the compressing element is constant in a suction stage and a compression stage.

5 Claims, 11 Drawing Sheets

METHOD AND APPARATUS FOR CONTROLLING INDUCTION MOTOR FOR COMPRESSOR

TECHNICAL FIELD OF THE INVENTION

The present invention relates to a compressor constituted by housing an induction motor and a compression element rotated and driven by a rotor of the induction motor in a same casing, and more particularly, to a control method and control apparatus which reduces vibration and noise of the compressor by controlling the driving torque of the induction motor.

BACKGROUND OF THE INVENTION

A compressor control system is known from Japanese Patent Laid-Open No. 60-60286/1985. The control system disclosed in this reference provides a motor output torque in synchronism with the change of a load torque applied in one revolution of a motor rotor for driving a compression element of the compressor. In other words, the control system always detects the load torque during one revolution of the rotor and changes the motor output in such a manner as to correspond to this load torque.

Generally, as a rotating position detector of a compressor motor, a detector which detects the rotating position of the rotor by coupling directly a gear or an encoder to a spindle of the motor and disposing a sensor for detecting pulses at the time of revolution, is known as described in Japanese Patent Laid-Open No. 63-23585/1988.

In accordance with the control system of the compressor having the construction described above, the rotating position of the compressor must always be detected, and there remain problems in that a large number of position detectors are necessary, in that a high level of accuracy is required for this position detection, in that the outputs of the motor must be successively calculated and outputted sequentially, with the result being the control circuit becomes complicated.

In the rotating position detector of the motor having the construction described above, the sensor must be disposed directly inside the compressor and for this reason, the Freon resistance, temperature resistance requirements and pressure resistance of the sensor must be fulfilled and the service life of the sensor cannot be secured sufficiently. Though a sensor having an improved Freon resistance has been developed, a sufficiently long service life cannot yet be secured.

SUMMARY OF THE INVENTION

In view of the problems described above, the present invention is directed to provide a control method which can effect torque control of an induction motor by simple position detection and a simple control system.

It is another object of the present invention to provide a control apparatus of an induction motor for a compressor which does not cause the problems of the Freon resistance, the temperature resistance and the pressure resistance even when using an ordinary general-purpose type sensor.

According to the compressor of the present invention wherein an induction motor and a compression element rotated and driven by a rotor of the induction motor are housed in a same casing, an A.C. power of a pattern having a predetermined change, which is determined in advance so as to correspond to the rotating angle of the compression element, is sequentially supplied to the induction motor from a specific phase position of the A.C. power whenever the rotating angle of the compression element reaches a predetermined angle.

The pattern is set so that the frequency at the phase position corresponding to the rotating angle, at which the driving torque required by the compression element becomes great, is greater than the frequency of one period of the pattern. Furthermore, the pattern is set so that the change of the frequency in one period of the A.C. power supplied to the induction motor becomes continuous.

The compressor which employs the control method of the present invention comprises typical permanent magnets which rotate with a rotating shaft, recesses formed by depressing part of an enclosed casing so as to face the permanent magnets, magnetic detection elements in the recesses for detecting the magnetism of the permanent magnets and a control portion for determining the rotating position of a rotor from the output change of the magnetic detection elements. A closed-end cylinder can be used and inserted from outside the casing in an air-tight manner in place of forming the recess on the casing.

By the control system described above, the A.C. power of the pattern which changes the output to the induction motor in accordance with the change of the load torque changing in one revolution of the compression element of the compressor can be obtained.

BRIEF DESCRIPTION OF THE DRAWINGS

FIG. 8 (A), 8 (B), and 8 (C) are flowcharts showing the generation of the ON/OFF signals;

PREFERRED EMBODIMENTS OF THE INVENTION

Figure 1:
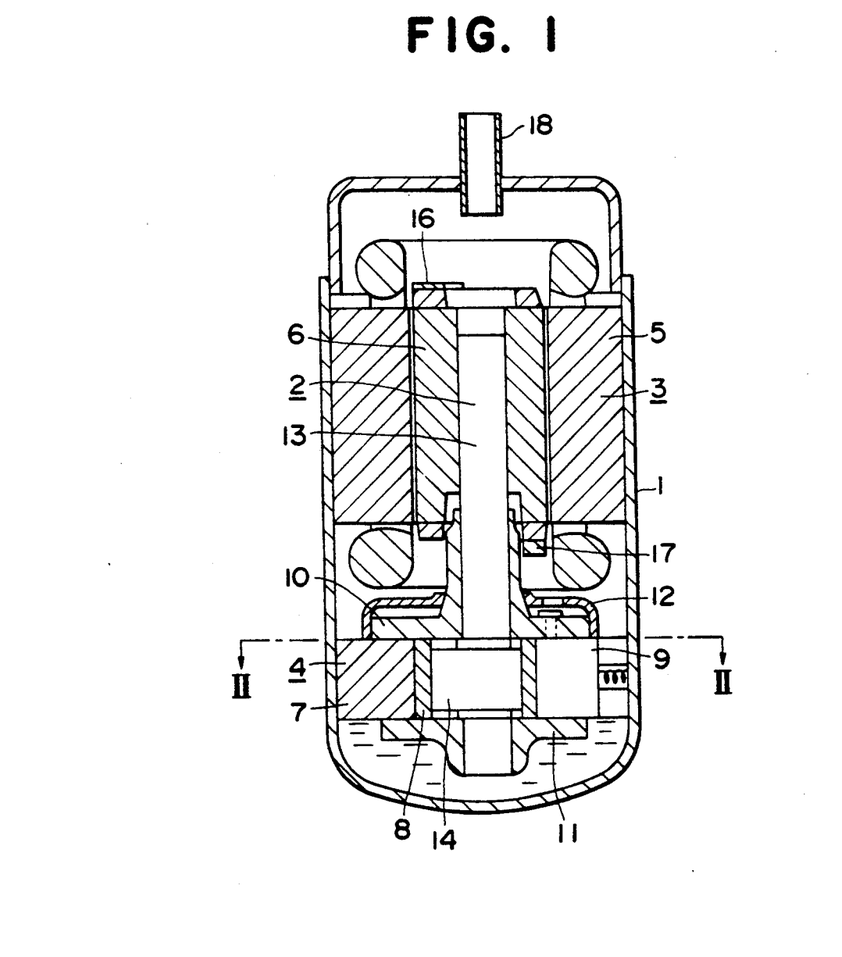
FIG. 1 is a sectional elevation view of a compressor using a control system of the present invention.

Hereinafter, preferred embodiments of the present invention will be explained with reference to the drawings. FIG. 1 is a sectional view of a compressor. A sealed casing 1 houses therein a compression element 4 and a three-phase induction motor 3. The three-phase induction motor 3 has a stator 5 on which three-phase windings are wound and a rotor 6 which rotates in response to the magnetic field generated from the stator 5. The compression element 4 is connected to the shaft 13 of the rotor 6. The compression element 4 has a shaft 13 and crank portion 14 rotating as a crank shaft 2, a roller 8 which is rotated by the crank portion 14 inside a cylinder 7, upper and lower bearing portions 10 and 11, respectively, which close the openings of the cylinder 7 and a cup muffler 12 which is fitted to the upper bearing portion 10. A vane 9 is disposed in contact with the roller 8 and partitions the inside of the cylinder 7 into a high pressure chamber and a low pressure chamber. Reference numerals 16 and 17 represent balancers, which are disclosed in such a manner as to balance either dynamically or statically with the crank portion 14 of the crank shaft 2. A discharge pipe 18 is fitted to the upper wall of the sealed casing 1.

Figure 2:
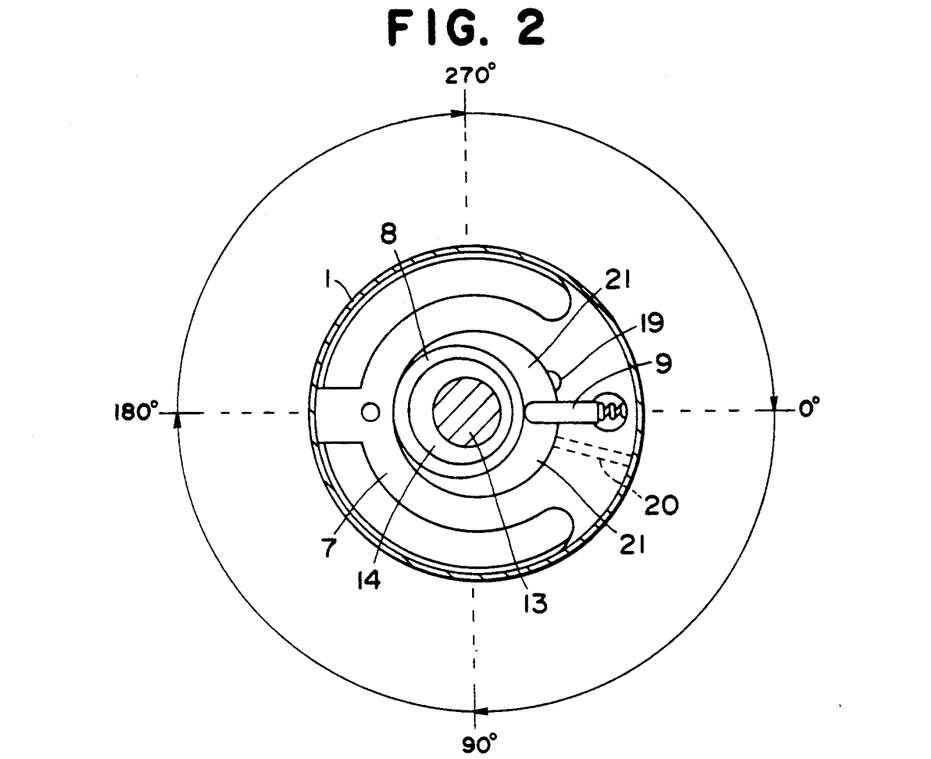
FIG. 2 is a sectional view of the compressor taken along line II—II shown in FIG. 1.

In FIG. 2, which is a sectional view taken along line II—II of the compressor shown in FIG. 1, a discharge port 19 and a suction port 20 are provided. The zones 21a and 21b, inside the cylinder 7 represent the high pressure chamber and the low pressure chamber, respectively. The roller 8 rotates in a direction represented by the solid line arrows in FIG. 2 and the contact position of the roller 8 with the cylinder 7 is expressed as a rotating angle up to 360°. In the state shown in FIG. 2, the rotating position of the roller 8, that is, the crank shaft 2 (shaft 13), is at the position of 180°.

Figure 3:
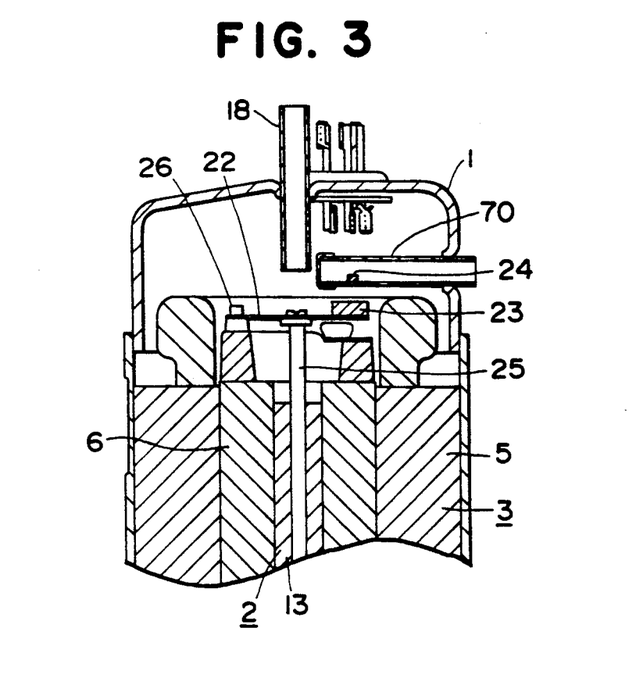
FIG. 3 is a sectional view of the principal portions showing a position detector fitted to the compressor shown in FIG. 1.

In FIG. 3, which shows the state where a position detector for detecting the rotating position of the compression element 4 is fitted to the compressor shown in FIG. 1, the compression element 4 rotates simultaneously with the rotor 6 through the crank shaft 2 (the shaft 13 of the rotor 6) and, accordingly, the rotating angle of the compression element 4 can be detected by simply detecting the rotating angle of the rotor 6. The position detector has a magnet 23 bonded to a disc 22 and a magnetic detector (Hall device, Hall IC, coil for magnetic detection, magnetic wire) such as a Hall device 24. The disc 22 is fitted to the shaft 13 by a bolt 25 so that the center of its rotation is in agreement with that of the shaft 13. The positional relation between the magnet 23 and the Hall device 24 is determined such that when the rotating angle shown in FIG. 2 is 0°, the Hall device 24 the detects magnetism and changes the output. Accordingly, an output can be obtained whenever the crank portion (rotor) of the compression element 4 has a rotating angle of 0°. The Hall device 24 is disposed at the bottom of a pipe 70 by fitting this closed-end pipe 70 (cylindrical or polygonal) from the side of the casing 1 of the compressor. The pipe 70 is welded to the casing 1 to prevent the leakage of a high pressure gas inside the compressor. A balancer 26 is provided to correct the weight unbalance occurring when the magnet 23 is fitted.

Figure 12:
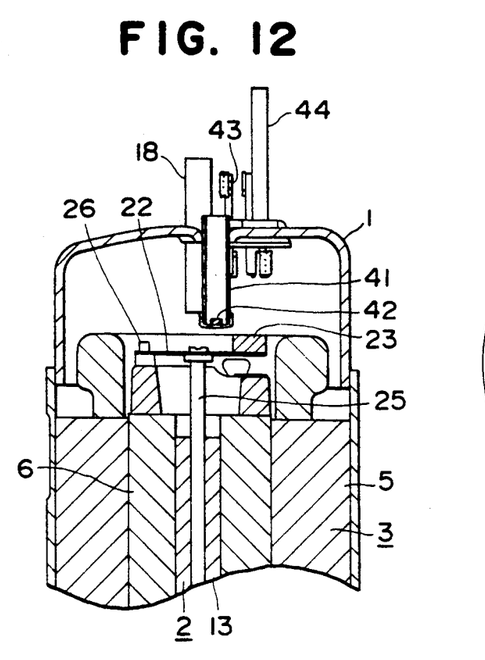
FIG. 12 is a sectional view of the compressor in accordance with another embodiment of the present invention and shows a Hall device as an example of a magnetic detector.

The pipe 70 has a diameter permitting the insertion of the Hall device 24, for example, and is made of copper, and a cap is welded to one of the ends of the pipe 70 to form the closed-end pipe 70. As will be described presently with reference to FIG. 12A, the Hall device can be constituted in such a manner that after it is fitted to a substrate having a size that can be fitted into the pipe 70, the Hall device is then fitted into the pipe 70 with the substrate.

Figure 4:
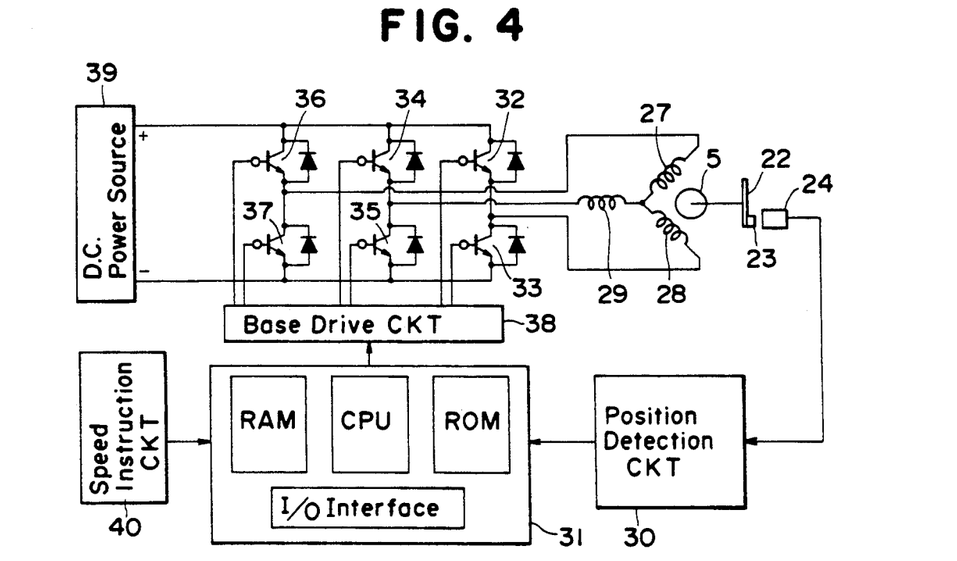
FIG. 4 is a circuit diagram showing a control circuit for the compressor shown in FIG. 1.

In FIG. 4, which is a control circuit diagram for controlling the operation of the compressor shown in FIGS. 1-3, reference numerals 27-29 represent the stator windings of the induction motor 5 and these windings are star-connected. The magnet 23 fitted to the disc 22 of the rotor 5 rotates when a three-phase alternating current is supplied to the stator windings 27-29. Accordingly, the output of the Hall device 24 changes due to the rotation of the rotor 6 (compression element) and the position detection circuit 30 converts the output change and supplies it to a control portion 31. Switching devices 32-37 effect ON/OFF operations and are connected in a three-phase bridge form. The switching devices 32-37 convert the D.C. power supplied form a D.C. power source 39 to the three-phase A.C. power and supplies the three-phase A.C. power to the three-phase stator windings 27-29. Diodes for discharging the stored charge and for forming a circulation circuit of a circulating current occurring in the stator windings 27-29 are connected to the switching devices (semiconductor switching devices such as transistor devices, FET devices, GTO devices, etc) 32-37, respectively. The D.C. power source 39 may be realized either by rectifying and smoothing A.C. power or by a D.C. battery. The ON/OFF operation of the switching devices 32-37 is controlled by the signal supplied from the control portion 31 through a base drive circuit 38. The control portion 31 consists primarily of CPU, RAM, ROM, I/O interface, and the like, calculates the frequency on the basis of a speed signal from a speed instruction circuit 40 and controls the ON/OFF operation of the switching devices 32-37 so that the A.C. power of this frequency can be supplied to the stator windings 27-29.

Figure 5:
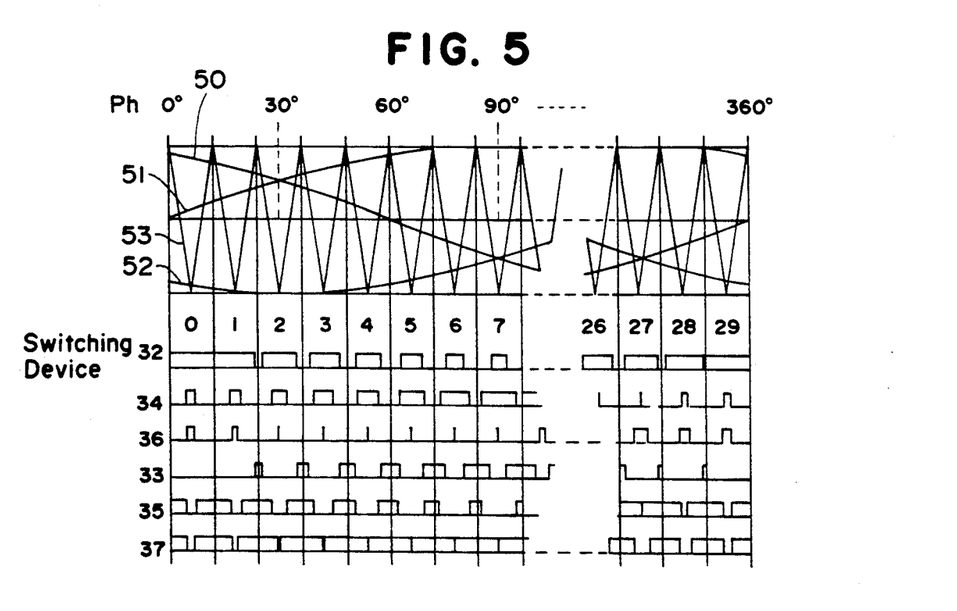
FIG. 5 is a diagram showing ON/OFF activation of the switching devices.

Hereinafter, the switching signals to be supplied to the switching devices 32-37 will be explained. FIG. 5 is a diagram for obtaining the switching signals on the basis of the PWM theory. In this diagram, reference numerals 50, 51 and 52 represent sine waves, and their phases are deviated by 120° from one another. Reference numeral 53 represents triangular waves, and the outputs obtained by comparing the sine waves 50-52 with the triangular waves 53 are the switching signals to the switching devices 32, 34, 36. The switching signals to the switching devices 33, 35, 37 are those which are obtained by inverting the switching signals of the switching devices 32, 34, 36. The three-phase power having the same frequency as the sine waves 50-52 can be supplied to the stator windings 27-29 of the induction motor by use of these six kinds of switching signals. Accordingly, if the frequency of the sine waves 50-52 is changed, the frequency of the A.C. power to be supplied to the stator windings 27-29 can be changed. The voltage of the alternating current to be supplied to the stator windings 27-29 (the voltage when replaced by the sine wave) can be changed by changing the amplitude ratio between the sine waves 50-52 and triangular wave 53. In the present invention, the switching signals based on the PAM theory can be used likewise.

The switching patterns (ON/OFF) of the switching devices 32-37 obtained in this manner are stored in ROM, all the patterns or part of the patterns may be stored and may be combined at the time of read-out. Furthermore, the patterns may be stored by dividing the time into the time for the ON-signal output and the time for the OFF-signal output. Still further, the patterns may be stored by dividing the pattern corresponding to one period into predetermined phase angles and dividing further the predetermined phase angle into the ON time and the OFF time.

The switching signals of the switching devices 32-37 may be calculated from the difference between the sine wave and the triangular wave at the time of a designated phase angle. In this case, the switching signal for one period can be obtained by changing the designated phase angle from 0° to 360°.

Figure 6:
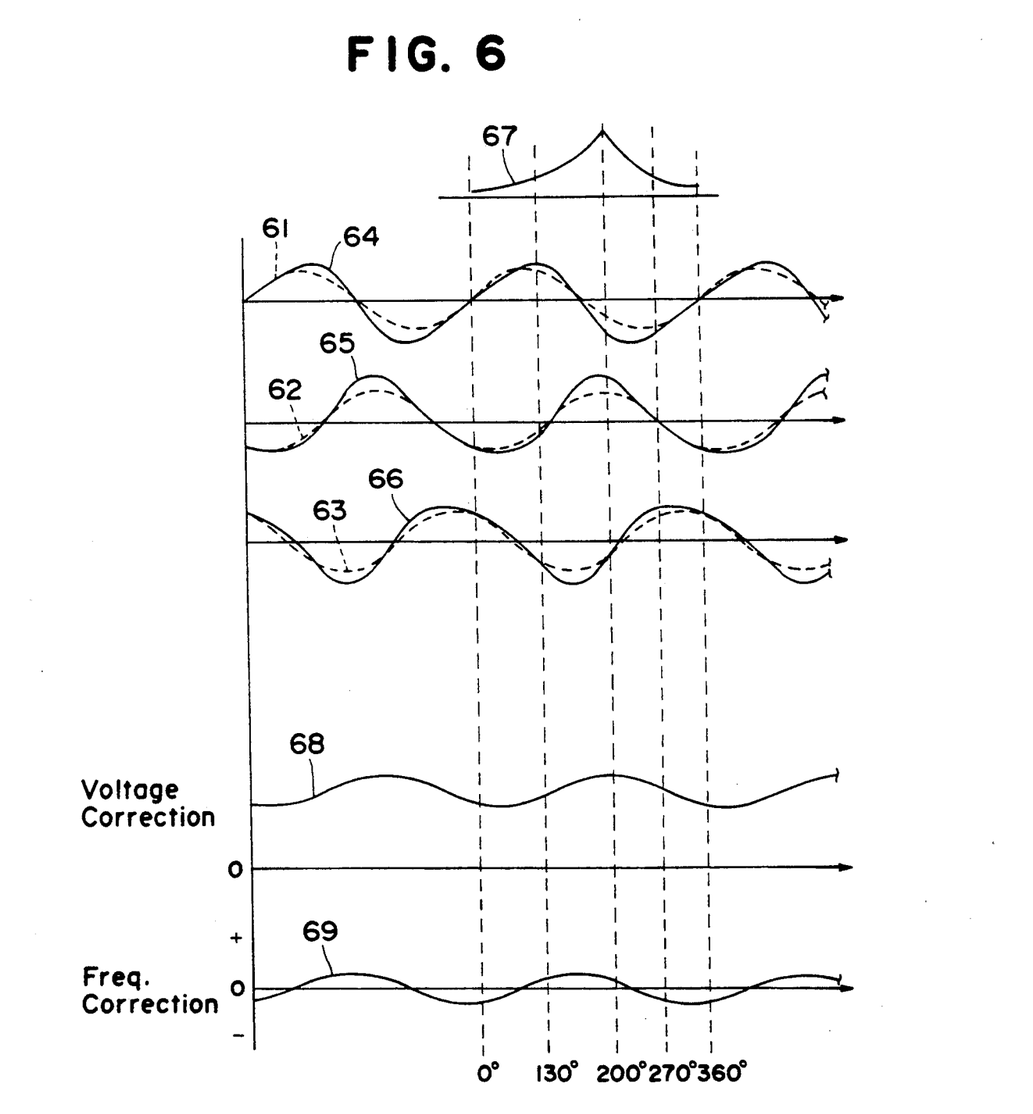
FIG. 6 is a voltage waveform diagram of a three-phase alternating current obtained by ON/OFF activation of the switching devices.

FIG. 6 is a diagram of the three-phase A.C. voltage waveforms (replaced equivalently to the sine waves) 61-63 obtained by the ON/OFF operation of the switching devices 32-37. The phases of voltage waveforms are deviated by 120° from one another. In the present control system, this output voltage is not applied merely to the stator windings 27-29 but the supply of the voltage to the stator windings 27-29 is started from the position of the phase angle 0° shown in FIG. 6 in synchronism with the signal from the position detector whenever the rotating angle of the crank portion 14 of the compression element 4 reaches zero (0). In the following description, the slip of the motor will be omitted. Accordingly, when the rotating angle of the compression element is 0°, the voltage supplied to the stator windings is always equal to the voltage at the time of the phase angle =0° shown in FIG. 6. Reference numeral 67 represents the waveform illustrating the relation of the driving torque necessary when the compression element 4 is driven. In this manner, the torque change exists during one revolution of the compression element and this torque change results in vibration of the compressor. Accordingly, the output of the induction motor must be increased to correspond to this driving torque. Assuming, for example, that the portion requiring a large torque during one revolution of the compression element is limited near to the portion where the rotating angle of the crank portion is 200° (in the case of one cylinder), then the voltage to be applied to the stator windings may be made higher than the ordinary voltage when the crank portions exists at a rotating angle near to this rotating angle. The rotating angle of 0° of the crank portion 14 and the phase angle of 0° of the voltage pattern are brought into conformity by the output of the position detector 30 and the rotating angle of the crank portion and the phase angle of the pattern of the voltage supplied to the stator windings are in agreement with each other (with the proviso that the slip of the induction motor is neglected). Therefore, it is possible to cope with this torque change by making the voltage higher near the phase angle 200° of the voltage waveforms 61-63 shown in FIG. 6 than the ordinary voltage.

The voltage waveforms 64-66 shown in FIG. 6 take this torque change into consideration. In other words, the voltage waveform 64-66 increases the voltage and the frequency (the frequency in one period of this pattern, that is, the angular velocity of the phase) near the phase angle of 200° so as to increase the output torque of the motor, and reduces the voltage and the frequency near the phase angle of 0° so as to reduce the output torque of the motor. The voltage and frequency of the voltage pattern are set so that the output changes continuously between the phase angle for increasing motor output and the phase angle for decreasing it. In FIG. 6, reference numerals 68 and 69 represent examples of the waveform used for voltage correction and the waveform used for frequency correction, respectively. The voltage waveforms 64-68 are obtained by multiplying the three-phase A.C. waveforms 61-63 by the correction values such as the waveforms 68, 69.

Accordingly, the data for obtaining the switching signals which make it possible to supply these voltage waveforms 64-66 to the stator windings 27-29 are stored in ROM of the control portion 31 as described above. Practically, however, the amplitudes of the voltage waveforms 64-66 are set in accordance with the actual change of the driving torque of the compression element in order to further change the amplitude of the voltage waveform in accordance with the frequency.

When these switching signals obtained in this manner are supplied to the switching devices 32-37, the vibration of the compressor can be restricted by increasing the output of the induction motor 3 when the compression element 4 requires a large torque.

The switching signals for obtaining the voltage waveforms 61-63 shown in FIG. 6 can be calculated if the frequency f, the output voltage V and the phase Ph for obtaining the desired switching signal are determined. Incidentally, the frequency f is equal to the frequency signal given from the speed instruction circuit 40 and the basic value of the output voltage V is determined on the basis of the value f so as to satisfy the relation V/f=constant, and this constant value is set so that operation efficiency of the induction motor or in other words, the compressor, is desirable at each frequency. The switching signals for obtaining the A.C. power for one period are supplied by changing the Ph value within the range of 0° to 360°. Practically, the value of Ph is advanced by ΔPh period, the same switching signal is maintained. If this advance quantity ΔPh is increased, resolution in one period becomes worse and if this value is decreased, resolution can be improved, but the optimum ΔPh value is set in advance for each frequency from the relationship between the responding switching time of the switching device and the processing capacity of the control portion 31.

Figure 7:
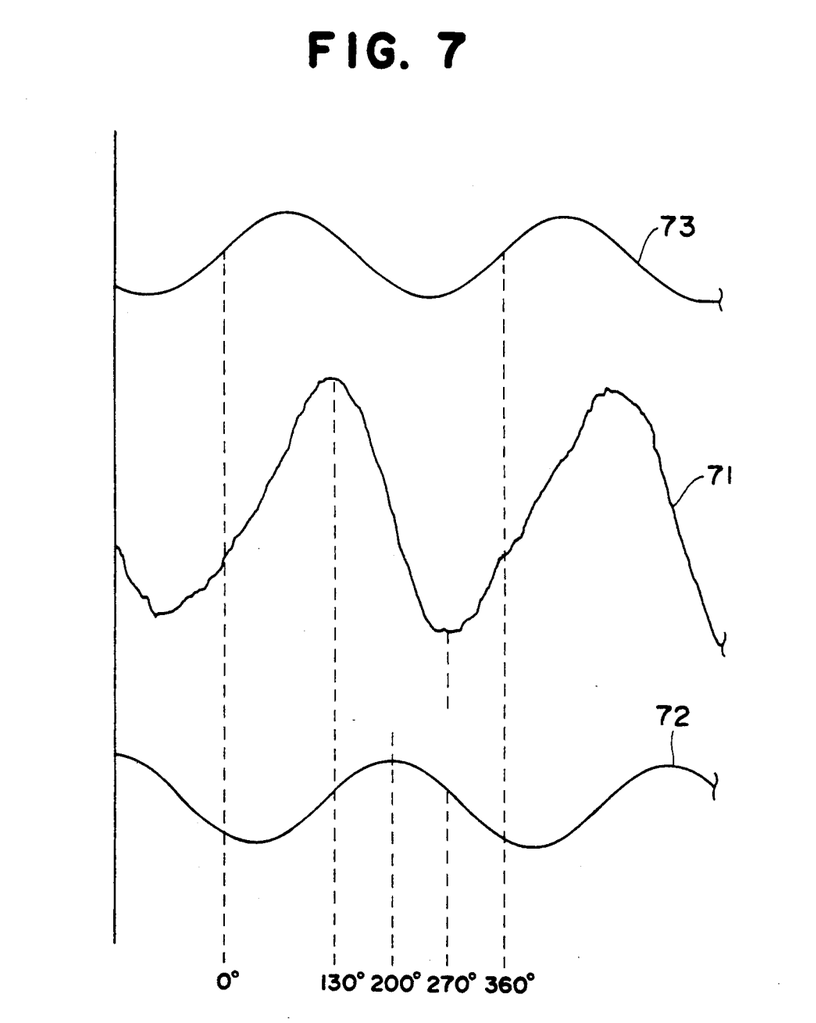
FIG. 7 is a vibration waveform diagram obtained by measuring an actual vibration state of the compressor shown in FIG. 1.

FIG. 7 is a vibration waveform diagram obtained by measuring the actual vibration state of the compressor. Measurement of the vibration waveform 71 was made by fitting an acceleration sensor (not shown) to the outer periphery of the compressor (near the upper end of the stator 5 shown in FIG. 1) and obtaining the waveform from the output of the sensor. The angles in this diagram are in agreement with the rotating positions of the crank portion 14 shown in FIG. 2. As can be seen from this diagram, the amplitude of the vibration becomes great when the crank portion 14 of the compression element is located in the range of 130°-270°. This range 130°-270° is in agreement with the compression stroke in the compression element.

The vibration waveform 71 was obtained when the A.C. power obtained by use of the voltage waveform 73 which was applied to the stator windings of the compressor is supplied. A description of the other phases of the three-phases will be omitted for simplification because only the phase is different. This voltage waveform 73 can be expressed by the following formula:

$$V = V_0 \sin \theta \quad (1)$$

Accordingly, the formula (1) may be corrected so that the driving torque is increased in the region between 130° and 270°. In other words, the amplitude of the formula (1) in this region is increased so as to increase the driving torque.

The following example represents the case where this correction is made by approximation of the sine wave. Since the region in which the increase in the driving torque is necessary is from 130° to 270°, a sine wave 72 whose peak exists at the center of this region, that is, at the position of 200°, is set. This sine wave 72 has the same period (frequency) as a sine wave 73 and its function can be expressed as below:

$$V = A \sin (\theta = 110°) \quad (2)$$

Here, the symbol A represents the amplitude of the sine wave 52. Accordingly, the sine wave for obtaining the required driving torque for the compression element is the sum of the formulas (1) and (2) and is expressed by the following formula (3):

$$\begin{aligned} V &= (V_0 \sin \theta) + (A\sin(\theta + 110°)) \\ &= V_0(1 + A/V_0)(\sin\theta + \sin(\theta + 110°)) \end{aligned} \quad (3)$$

The value $A/V_0$ is selected arbitrarily within the range of 0.05–0.2 in accordance with the frequency applied to the induction motor.

A large driving torque can be obtained during the compression stroke of the compression element by obtaining the switching signals from the sine wave represented by the formula (3) and from the triangular wave 53 shown in FIG. 5. At this time, the voltage applied to the induction motor during one revolution of the compressor (i.e., the effective voltage after being converted to the sine wave) changes. Accordingly, the condition, V/f=constant, described above is no longer satisfied and operation efficiency of the compressor drops. The drop of efficiency can be prevented by changing the f value. The f value, that is, the frequency, is changed in accordance with the change of the voltage during one revolution of the compressor rotor. The change of the frequency, too, is corrected so that the peak of correction exists at the angle of 200°, in the same way as in the correction of the voltage. At this time, correction is made so that correction on the positive side becomes greater than correction on the negative side.

This example effect correction by approximation of the sine wave, but this method is not particularly so limitative. For example, on approximation formula such as a (sin)² wave, which is used in place of the formula (1) in this case, may be set in accordance with the torque characteristics of the compression element.

Figure 8A:
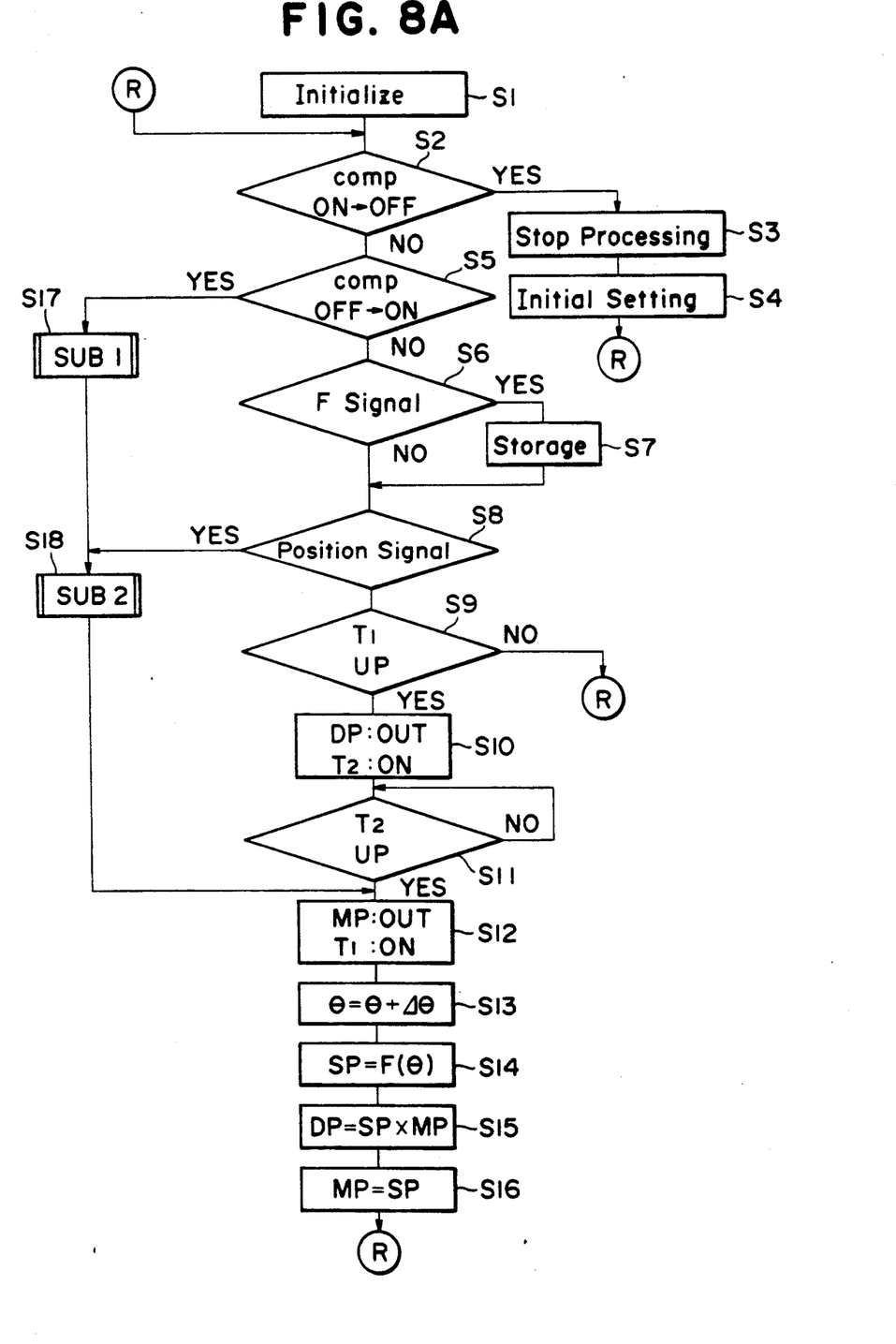

FIG. 8A is a flowchart showing the operation when correction is made by use of the formula (3).

Initialization is performed at step S1. In other words, the microcomputer is switched on and initial constants, the constants f=20 Hz, $\Delta\theta = \alpha$, $T_1 = \beta$ to be used for the starting frequency 20 Hz and a constant $T_2 = \tau$ are set. The time $T_2$ is a dead time used in the process in which the ON/OFF combination of the switching devices changes. This time is set to be longer than the discharge time of the stored charge of the switching devices and prevents their short-circuit. Therefore, this time $T_2$ depends on the switching speed of the switching device and is generally from several hundreds of milli-seconds to several hundreds of micro-seconds. In this example, T=0.01 msec.

Whether or not the input of the signal which turns the operation of the compressor from ON to OFF ("ON→OFF") exists is judged at step S2 and if such an "ON→OFF" signal exists, the process proceeds to step S3, where the stop processing of the compressor is executed by sequentially lowering the frequency of the compressor to thereby stop the compressor. Next, initial setting of constants is made in the same way as at step S4. Thereafter, the process returns to R.

Whether or not the input of the signal which turns the operation of the compressor from OFF to ON ("OFF→ON"), or otherwise the operation by a user, exists is judged at step S5 and if such an "OFF→ON" signal exists, the process shifts to step S17, that is, a subroutine SUB1, which will appear later, for starting.

At step S6, a judgement of whether the "F signal exists" is made, that is, whether or not the signal for setting (or changing) the frequency is received. If such an F signal exists, this value is stored in the memory portion at step S7.

At step S8, a judgement of whether the "position signal exists" is made, that is, whether or not the signal from the magnetic detector is received after the compression element reaches a predetermined rotating angle, and if such a position signal exists, the process proceeds to step S18, that is, a subroutine SUB1 (which will appear later) for phase alignment.

At step S9, whether or not the timer $T_1$ achieves time-UP is judged and if the timer $T_1$ does not achieves time-UP, the process shifts to R. In other words, steps S2, S5, S6, S8 and S9 are repeated until the timer $T_1$ achieves time-UP.

The ON/OFF signal DP for the dead time is supplied at step S10 and at the same time, the timer $T_2$ is started. This ON/OFF signal DP represents the ON/OFF combination state of each switching device and assuming that six switching devices exist (if the invertor circuit has three-phases), this signal DP is expressed as follows:

$$DP = \text{"1, 0, 0, 0, 0, 0, 0, 0"}$$

The actually effective bits are the higher order six bits, and "1" corresponds to ON and "0" to OFF. Since the size of the memory portion has the 8-bit unit, the lower order two bits are handled as inefficient data. This ON/OFF signal DP is obtained by calculation at step S15 and is stored in the memory portion DP.

When the ON/OFF signal DP is supplied, an RS-FF (reset/set flip-flop) circuit (not shown) holds the switching device under this ON/OFF state until the next ON/OFF signal is received.

Whether or not the timer $T_2$ achieves time-up is judged at step S11. When this timer $T_2$ achieves time-up, the process shifts to step S12.

At step S12, the ON/OFF signal MP is supplied to change the ON/OFF state of the switching device and at the same time, the timer $T_1$ is started. The ON/OFF signal MP is obtained by calculation at step S14.

Processing of "$\theta = \theta + \Delta\theta$", i.e., processing for advancing the phase angle, is made at step S13 and the phase angle of the alternating current to be supplied to the induction motor, that is, the phase angle of the modulation wave when obtaining the ON/OFF signal, is advance by $\Delta\theta$.

The ON/OFF signal SP is determined at step 14. This signal SP is determined by $F(\theta)$ and obtained by comparing the corrected formula (3) described above with the triangular wave 53 shown in FIG. 5. Therefore, the ON/OFF state of the switching devices 32-37 (FIG. 4) at the phase angle $\theta$ can be determined. The ON/OFF state of the switching devices for one period can be obtained by advancing this phase angle by $\Delta\theta$ from 0° to 360°. This SP value is as follows, for example,

SP="1, 1, 1, 0, 0, 0, 0, 0"

and the lower order two bits are handled as inefficient data in the same way as the ON/OFF signal DP.

Step S15 makes "DP=SP×MP" and calculates the ON/OFF signal for the dead time which is used in the process in which the ON/Off signal MP changes to the ON/OFF signal SP. The ON/OFF signal DP is obtained by calculating the logical product (AND) at the bit level between the ON/OFF signal MP and the ON/OFF signal SP.

Figure 9:
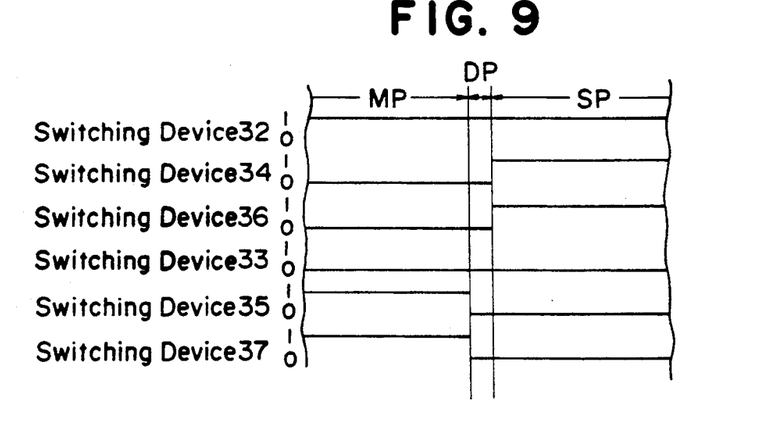
FIG. 9 is a diagram showing the relation between MP, SP and DP at the time of shift of the ON/OFF signal from MP to SP.

Assuming that SP="1, 1, 1, 0, 0, 0, 0, 0" and MP="1, 0, 0, 0, 1, 1, 0, 0", then DP is DP="1, 0, 0, 0, 0, 0, 0, 0". If this relation is as shown in FIG. 9, the ON/OFF state of the switching devices 32-37 changes as MP→DP→SP. Accordingly, when the operation of the arm of the bridge consisting of the switching device 34 and the switching device 35, for example, is considered, the switching device 34 below the arm becomes ON→OFF and the switching device 35 above the arm changes to OFF→ON. At this time, even if the switching device 34 below the arm is belated due to the stored charge and is turned OFF belatedly from the switch signal, the switching devices 34, 35 above and below, respectively, the arm in the ON/OFF signal DP are simultaneously turned OFF. Accordingly, the switching device 34 above the arm has not yet been turned ON. In other words, the switching devices above and below the arm are prevented from changing to the ON state simultaneously.

Step S16 executes "MP=SP" and changes the content of the ON/OFF signal MP to the content of the ON/OFF signal SP. Accordingly, the value of next DP and the value of MP which is supplied in succession to the DP are stored in the memory portion.

Thereafter the flow process returns to R and the steps S2, S5, S6 and S8 are repeated until the timer $T_1$ achieves time-UP.

Figure 8B:
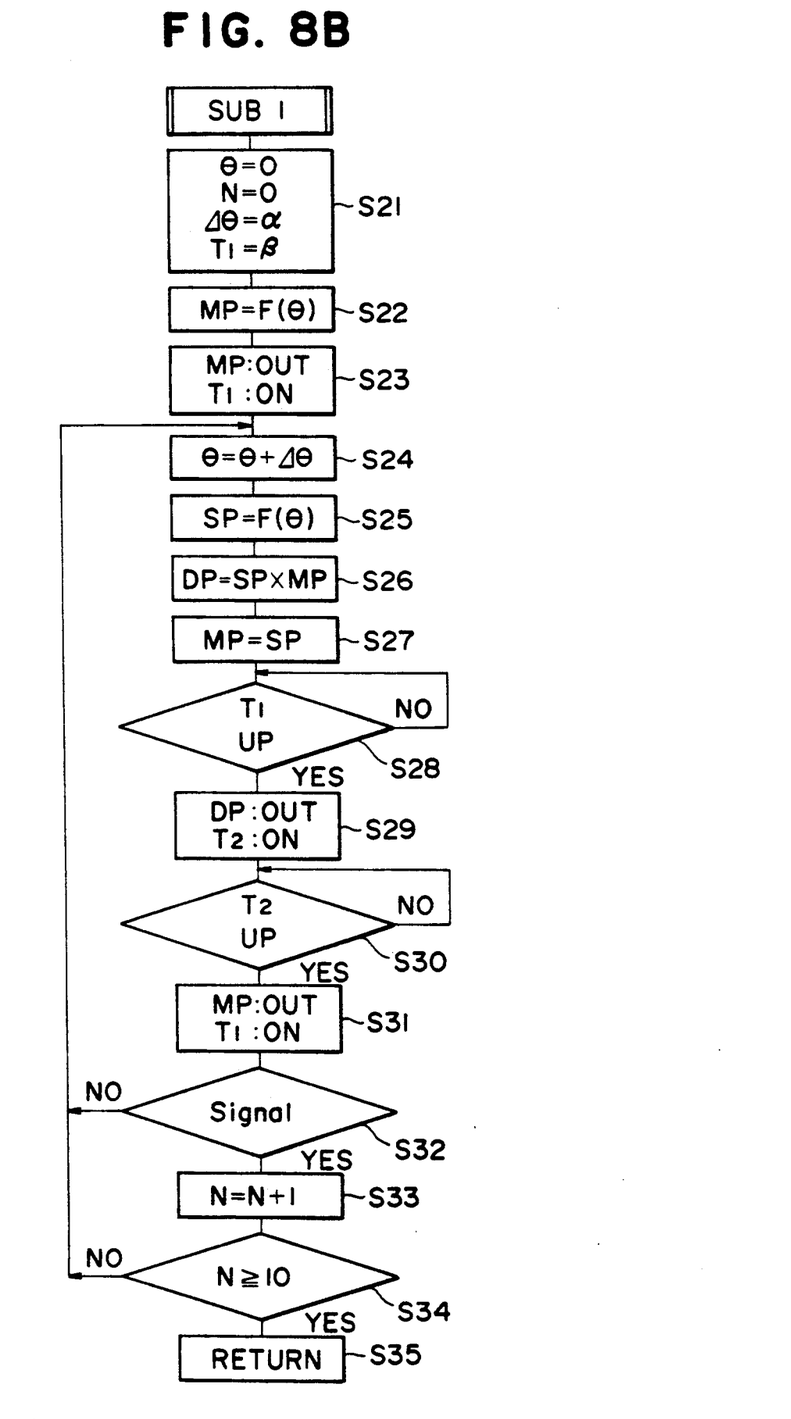

FIG. 8B shows the subroutine for start by step S17. Initialization of the constants is executed at step S21. In other words, the constants are set to $\theta=0$, N=0, $\Delta\theta=\alpha$ and $T_1=\beta$. The values $\alpha$ and $\beta$ are used at the time of f=20 Hz.

At step S22, the ON/OFF signal MP is calculated from the constants which are set at step S21. The signal MP is calculated by the same calculation as that of step S14 shown in FIG. 8A. However, the sine wave which is not corrected is used as the modulation wave.

The ON/OFF signal obtained at step S22 is supplied at step S23 and at the same time, the timer $T_1$ is started.

The processing of steps S24-S27 are the same as the processing of steps S13-S16 shown in FIG. 8A. The modulation wave used at step S25 is the sine wave which is not corrected.

Whether or not the timer $T_1$ achieves time-UP is judged at step S28 and when the timer $T_1$ makes time-UP, the flow shifts to step S29.

At step 29, the ON/OFF signal DP obtained at step S26 is supplied and at the same time, the timer $T_2$ is started.

Whether or not the signal from the magnetic detector 24 exists is judged at step S32 and steps S24-S31 are repeated during the period in which the signal does not exist. Therefore, $\theta$ is advanced sequentially by $\Delta\theta$ and the continuous A.C. output is obtained until such a signal exists. When the signal exists at step S32, the flow proceeds to step S33, where the count value N is incremented by 1 as N=N+1. Next, a judgement of "N≧10" is made at step S34 and if "N≧10" is satisfied, the process proceeds to step S35 and returns to the main routine shown in FIG. 8A.

Accordingly, the alternating current having a predetermined frequency is supplied to the induction motor irrespective of the signals from the magnetic detector 24 until the signals are obtained ten times, for example, at step S32 or in other words, during the period in which the actuation of the compressor is complete so that the revolution of the compressor becomes stabilized, and the signals from the magnetic detector can be obtained stably.

Figure 8C:
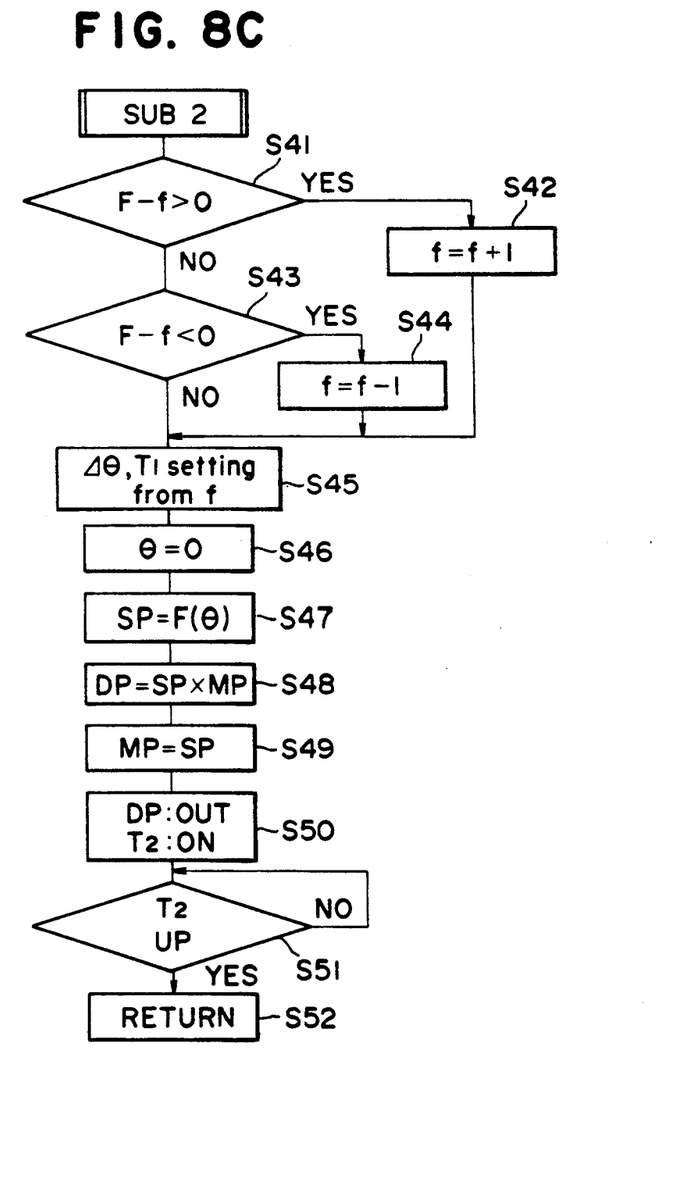

FIG. 8C shows the subroutine which represents the operation of step S18 to be executed when the magnetic detector 24 detects the position signal in FIG. 8A.

At step S41, whether or not the frequency signal F stored in the memory portion is greater than the A.C. frequency f which is being supplied at present is judged and if F>f, the value of f is increased to f=f+1 at step S42.

Judgement of whether "F<f" is made at step S43 and if "F<f", the value of f is decreased to f=f-1 at step S44.

At step S45, the values $\Delta\theta$ and $T_1$ are set on the basis of the value of the frequency f.

At step S46, the value of phase angle $\theta$ is set to 0. In other words, the present phase angle $\theta$ is changed to 0.

Steps S47-S49 execute the same operation as that of steps S14-S49 of FIG. 8A.

The ON/OFF signal DP obtained at step S48 is supplied at step S50 and at the same time, the timer $T_2$ is started. In other words, the ON/OFF signal is changed from MP to DP or MP→DP before the timer $T_1$ achieves time-UP and the timer $T_2$ is started.

At step S51, whether or not the timer $T_2$ achieves time-UP is judged and when it does, the process proceeds to step S52 and returns to the main routine shown in the flowchart of FIG. 8A.

In this subroutine, therefore, the time of $T_1$ and the value of $\Delta\theta$ are set once again on the basis of the value f whenever the position signal is obtained from the position detector 30 (FIG. 4) if any change first exists in the output frequency. Next, the ON/OFF signal DP, which is necessary to run from the present ON/OFF signal MP to the ON/OFF signal SP at the time of $\theta=0$, is obtained and after this ON/OFF signal DP is supplied, the process returns to the main routine of FIG. 8A.

Figure 10:
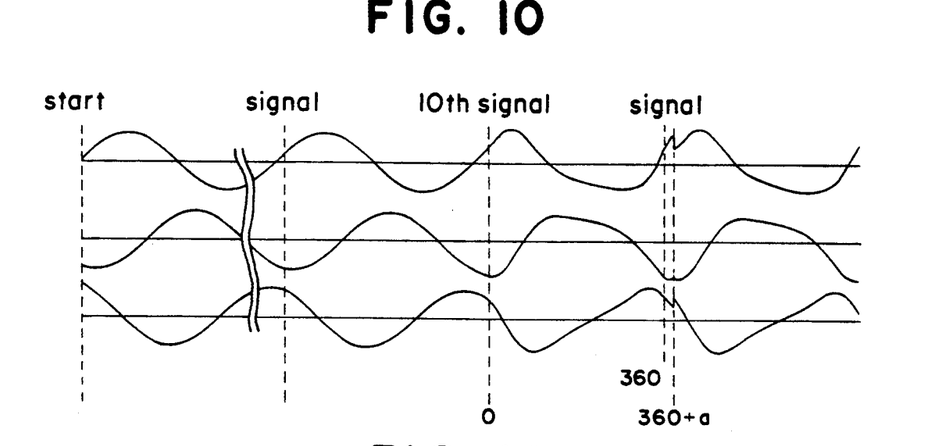
FIG. 10 is a waveform diagram of the three-phase alternating current when the three-phase alternating current is supplied to the induction motor by use of the flowcharts of FIG. 8A to 8C.

FIG. 10 shows the waveforms of the three-phase alternating current when the three-phase alternating current is supplied to the induction motor by use of the chart of FIGS. 8A to 8C. This waveform diagram shows the output waveform in a more comprehensible way by substituting equivalently the output waveform PWM by the sine wave.

First of all, when the operation is started, the 20 Hz three-phase alternating current devoid of correction is applied in accordance with the sub-routine SUB1. The induction motor is actuated by this alternating current. When the induction motor rotates, the permanent magnet rotates simultaneously and the position signal can be obtained once per revolution of the magnet 23 (FIG. 4). The number of this position signal is counted and when this count value reaches 10, the processing returns to the main routine for the normal operation and the supply of the corrected three-phase alternating current is started. The value $\Delta\theta$ is increased sequentially and the three-phase alternating current from 0° to 360° is supplied. Theoretically, the induction motor rotates once at the phase of 360° and the next signal can be obtained, but in practice, the next signal is obtained at the phase of "360°+a" due to the slip of the induction motor. The output of the three-phase alternating current is started once again from the phase 0° at the time at which this signal is obtained. Thereafter, the phase is returned to 0° whenever the signal is obtained and the output of the three-phase alternating current is started.

In this flow chart, the ON/OFF signal is calculated per each cycle, but it is possible to calculate in advance this signal, to store the data providing this calculating signal in ROM and to supply continuously the signals for one period in match with the 0° signal.

Figure 11:
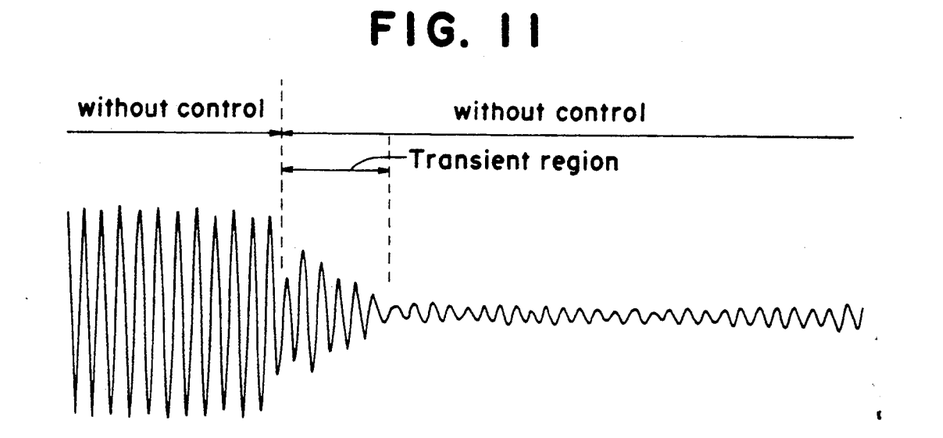
FIG. 11 is a vibration waveform diagram obtained by the control method of the present invention.

FIG. 11 is a vibration waveform diagram showing the change of the vibration waveform when the torque control is made in accordance with the flowchart described above, where the measurement of vibration is made in the same way as in FIG. 7. In this diagram, the output calculated by the waveformed diagram 61 shown in FIG. 6 is supplied to the induction motor in the region not having the torque control and the output calculated by the waveform diagram 64 shown in FIG. 6 is supplied to the induction motor in the region having the torque control. As can be understood from this diagram, the vibration becomes smaller when the torque control is made. A transient region develops before the vibration becomes small enough because the existence and absence of the control is changed over during the operation of the compressor.

As described above, the control system for the compressor having the induction motor in the present invention supplies sequentially the A.C. power of the pattern which is determined in advance to correspond to the rotating angle of the compression element, to the induction motor from the specific phase position of the A.C. power whenever the rotating angle of the compression element reaches a predetermined angle, and the pattern is formed by increasing the voltage or current at the phase position corresponding to the rotating angle at which the driving torque required by the compression element becomes great. Accordingly, the vibration resulting from the difference between the driving torque and the output can be reduced by bringing the output of the induction motor into conformity with the increase in the driving torque of the compressor.

Figure 13:
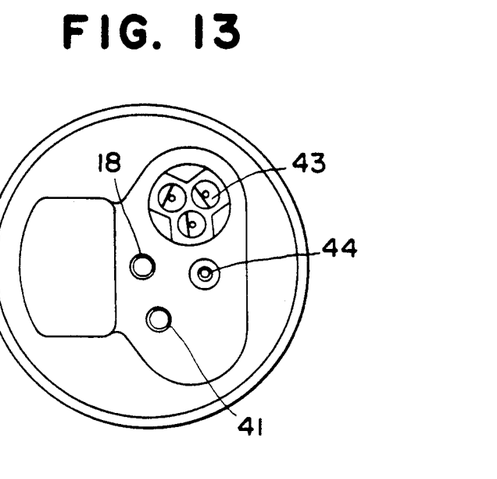
FIG. 13 is an upper sectional view of the compressor shown in FIG. 12.
Figure 14:
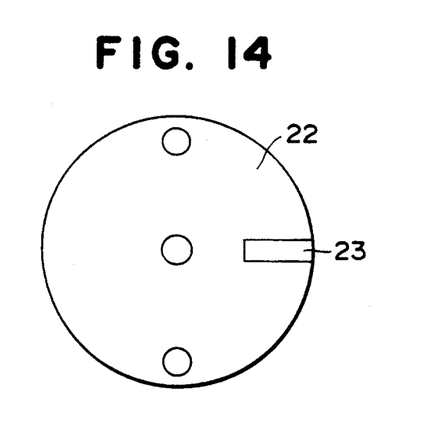
FIG. 14 is a top plan view of a disc adaptable to a rotor of the compressor shown in FIGS. 3 and 12.

FIGS. 12 and 13 are a sectional view of the principal portions and a top view, respectively, and show another example of the rotating position detector, and FIG. 14 is a top view of the disc 22 which is common to the embodiment shown in FIG. 3. The difference from the embodiment of FIG. 3 resides in that the closed-end pipe 41 is inserted from the upper part of the sealed casing 1 from the side of the discharge pipe 18 along the shaft 13 of the rotor 6. Reference numeral 42 represents the Hall device, 43 is the seal terminal of the compressor and 44 is a fitting bolt. A cover made of a resin is fitted in such a manner as to cover the seal terminals and the opening of the pipe 41. Since the pipe 41 is covered with the cover, it is possible to prevent dust and rain water from entering this pipe 41.

Figure 14A:
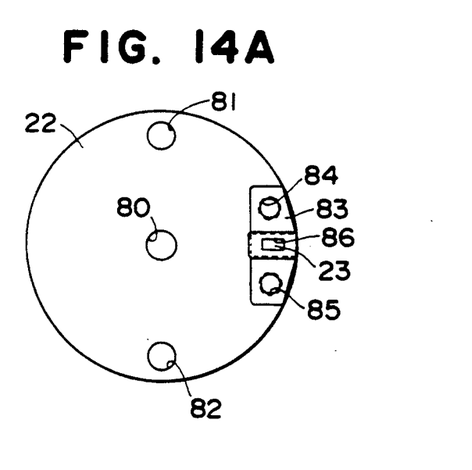
FIG. 14A is a top plan view showing a modified example of the disc shown in FIG. 14.

In FIG. 14A, showing a modified example of the disc 22, reference numeral 80 represents a hole through which the bolt 25 is inserted and the step portion of the bolt 25 clamps this hole and fixes the disc 22. A concavo-convexity may be formed in the hole to prevent an idle rotation of the bolt and the disc. Therefore, this disc 22 rotates with the rotor. Openings 81 and 82 facilitate the passing of a compression cooling medium through the disc 22. A fixing member (magnet fixing holder) 83 of the permanent magnet 23 is made of a non-magnetic material. The bar ring of the holder 83 is inserted into the caulked to the hole of the disc 22 at caulking portions 84, 85 when the holder 83 is fixed to the disc 22. A through-hole 86 is disposed so that part of the permanent magnet 23 can be seen through it when the permanent magnet 23 is fixed by the holder 83. When the permanent magnet 23 is seen through this through-hole 86, marks such as the polarity indication displayed on the magnet can be confirmed and the mistake of polarity of the permanent magnet 23 can be prevented.

Figure 15:
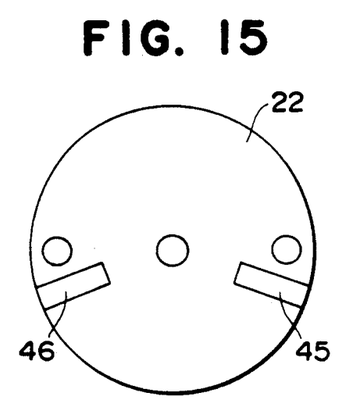
FIGS. 15 and 16 are upper sectional views, each showing another example of the disc.
Figure 16:
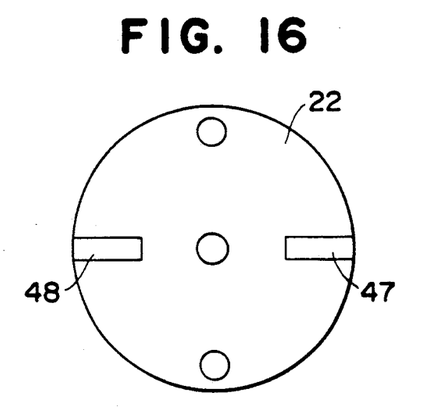

FIGS. 15 and 16 are top plan views showing the other embodiments in which the permanent magnet is fitted to the disc. FIG. 15 shows the case where the permanent magnets 45, 46 are disposed at positions where they supply the signals when the rotating positions of the rotor are 130° and 270°. When the permanent magnets are fitted in this manner, the output voltage of the A.C. power may be changed in accordance with the change of the output of the Hall device 24, 42 and the calculation of the rotating position becomes unnecessary. Thus, the controller can be simplified.

FIG. 16 shows the case where the permanent magnets are fitted at the positions where the rotating positions of the rotor are 0° and 180°. If the permanent magnets are fitted to such positions, the accurate rotating positions can be calculated by correcting twice the rotating positions of the rotor during one revolution.

Figure 17:
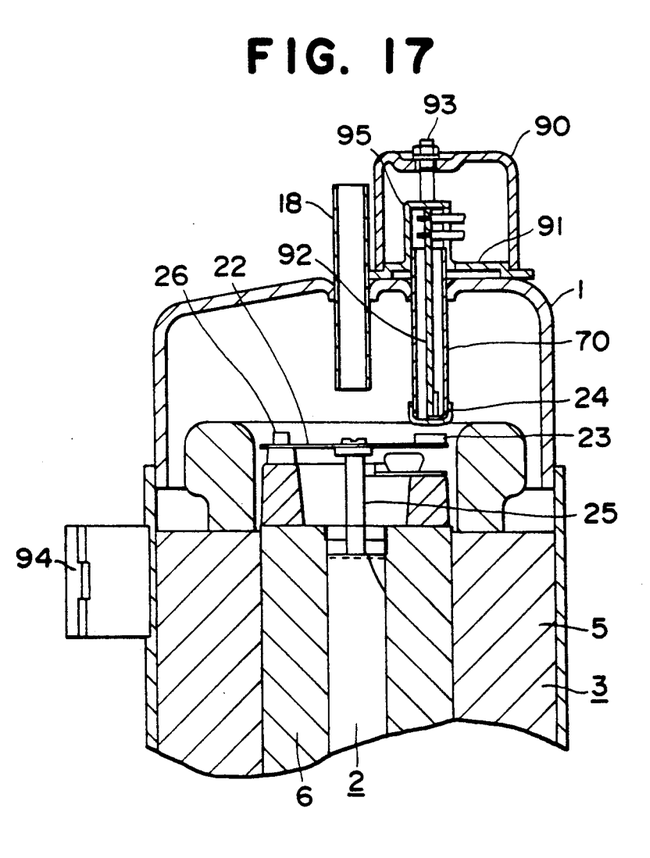
FIG. 17 is a sectional view showing another modified structure of the compressor.

In the compressor shown in FIG. 17, a pipe 70 made of copper has a size which can accept therein the Hall device 24. A cap is welded to one of the ends of the pipe to form the closed-end pipe. The Hall device 24 is fitted to the tip of a substrate 92 which has a size capable of being inserted into the pipe 70, and is then inserted into the pipe 70 with this substrate. A cover 90 is fitted to the upper part of the casing 1 through a gasket 91 by fitting a bolt 93 to a screw hole 96 of the casing 1. A support portion 95 for the substrate 92 is formed integrally with the gasket 91. The support portion 95 pushes the substrate 92 to the bottom of the pipe 70 and at the same time, covers the opening of the pipe 70. The support portion 95 and the gasket 91 having an inner diameter fitting to the outer diameter of the pipe 70 are made of a flexible material, such as a synthetic resin or rubber, and pushes the substrate 92 by flexibility of this material. In the drawing, reference numeral 94 represents an accumulator fitting metal.

We claim:

1. A method of supplying electric power to an induction motor for a compressor, said compressor having a compressing element rotated by said induction motor, comprising the steps of:

(1) detecting a rotational position of said compressing element, (2) supplying an electric signal when said detected rotational position corresponds to a predetermined position, (3) controlling the phase of a sine wave so that the value of said sine wave becomes maximum after a first predetermined period of time from the supply of said electric signal, (4) setting said first predetermined period of time so that said sine wave becomes maximum when said compressing element is rotated and positioned in a compression stage, (5) adding said sine wave to modulating waves to form combined modulating waves, said sine wave having the same frequency as said modulating waves, (6) generating modulated voltage waveforms from said combined modulating waves and a carrier wave according to PWM theory, and (7) switching DC power in accordance with said modulated voltage waveforms to thereby obtain said electric power.

2. A method of supplying electric power according to claim 1, further comprising the steps of:

(a) storing a switching signal for switching said DC power in accordance with said modulated voltage waveforms, said switching signal being divided into plural data and stored in a memory device, (b) providing outputs in response to said electric signal in a predetermined order, wherein said switching signal is generated by the use of said output data, and said DC power is switched to thereby obtain said electric power.

3. An apparatus for controlling an induction motor for a compressor comprising:

a casing;

an induction motor in said casing;

a compressor compression element rotatable in said casing and driven by said induction motor by a supply of AC power;

a position detector for supplying a signal when said compression element reaches a predetermined rotation angle;

AC power generation means for sequentially supplying a pseudo-sine wave alternating current generated on the basis of pulse width modulation in accordance with the change of a phase angle; and an output control portion of sequentially supplying said pseudo-sine wave alternating current from a predetermined phase angle to said induction motor whenever the pseudo-sine wave alternating current responds to the signal supplied from said position detector, wherein the modulation wave at the time of pulse width modulation is corrected by use of a triangular function, said triangular function having the same period as the modulation wave used for pulse width modulation and having a phase angle which increases in agreement with the rotating angle during a compression stroke of said compression element.

4. An apparatus according to claim 3, wherein said position detector has permanent magnets disposed inside said casing and rotating with said compression element and a Hall device disposed outside said casing to detect the magnetic flux of said permanent magnets.

5. A method of supplying electric DC power to an induction motor for a compressor, said compressor having a compressing element rotated by said induction motor, said electric DC power being supplied by switching ON and OFF in response to a switching waveform, said switching waveform being obtained by a modulating wave and a carrier wave according to PWM theory, comprising the steps of:

(1) detecting a rotational position of said compression element, (2) supplying an electric signal when said detected rotational position corresponds to a predetermined position, (3) generating a sine wave having a frequency equal to a frequency of said modulating wave, (4) regulating a phase of said sine wave when said electric signal is supplied so that the value of said sine wave becomes maximum after a first predetermined period of time from the supply of said electric signal, (5) setting said first predetermined period of time to be equal to a time period of moving said compressing element to a compression position from the supply of said electric signal, (6) adding said sine wave to said modulating wave to form combined modulating waves, wherein said switching signal is generated by the use of said combined modulating waves and said carrier wave according to PWM theory.

* * * * *